(12) United States Patent
Bion

(10) Patent No.: US 6,327,251 B1
(45) Date of Patent: Dec. 4, 2001

(54) SNAPSHOT ROUTING

(75) Inventor: Joel P. Bion, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/564,222

(22) Filed: May 3, 2000

Related U.S. Application Data

(63) Continuation of application No. 08/582,075, filed on Jan. 2, 1996, now Pat. No. 6,097,718.
(60) Provisional application No. 60/001,869, filed on Aug. 3, 1995.

(51) Int. Cl.[7] .................................................. H04L 12/28
(52) U.S. Cl. ........................... 370/255; 370/396; 370/410
(58) Field of Search ................................... 370/351–385, 370/396, 410, 466, 229, 319, 399, 400–402, 409, 446, 352, 392, 401–406, 254, 255; 379/273; 709/242

(56) References Cited

U.S. PATENT DOCUMENTS

| Re. 33,900 | 4/1992 | Howson . |
| 4,131,767 | 12/1978 | Weinstein . |
| 4,161,719 | 7/1979 | Parikh et al. . |
| 4,316,284 | 2/1982 | Howson . |
| 4,397,020 | 8/1983 | Howson . |

(List continued on next page.)

FOREIGN PATENT DOCUMENTS

| 0384758 | 2/1990 | (EP) . |
| 0431751 A1 | 11/1990 | (EP) . |
| 0567217 A2 | 10/1993 | (EP) . |
| WO93/07569 | 4/1993 | (WO) . |
| WO93/07692 | 4/1993 | (WO) . |
| WO94/01828 | 1/1994 | (WO) . |
| WO95/20850 | 8/1995 | (WO) . |

(List continued on next page.)

OTHER PUBLICATIONS

Allen, M., "Novell IPX Over Various WAN Media (IPX-WAN)", Network Working Group, RFC 1551, Dec. 1993, pp. 1–22.
Becker, D., "3c589.c: A 3c589 EtherLink3 ethernet driver for linux, becker@CESDIS.gsfc.nasa.gov", May 3, 1994, pp. 1–13.
Pei, et al., "Putting Routing Tables in Silicon", IEEE Network magazine, Jan. 22, 1992, pp. 42–50.

(List continued on next page.)

Primary Examiner—Hassan Kizou
Assistant Examiner—Afsar M. Qureshi
(74) Attorney, Agent, or Firm—Cesari and McKenna, LLP

(57) ABSTRACT

A method and system for maintaining and updating routing information in a packet switching network for a set of quasidynamic routes, in which intermittent routing updates are permitted, so that routes are no longer "always static" or "always dynamic", but may change over time between static and dynamic, and are treated accordingly. The invention is particularly applicable to dial-on-demand serial communication links, but is also useful in any situation where it is desired to reduce the overhead from routing updates over a communication link, or where transmission over a communication link is not reliable. A protocol manager for a dynamic routing protocol is modified to determine, for each route, (1) whether to send updated routing information for that route (at the time it would otherwise send an update for a particular route), and (2) whether to age that route in its routing tables (at the time it would otherwise age that route). The modified protocol manager thus prevents automatic aging of routes, while avoiding the use of manually configured static routing tables. Routing information is thus learned automatically and dynamically at appropriate times, and refreshed periodically so that it eventually reflects actual changes to the network topology.

12 Claims, 2 Drawing Sheets

U.S. PATENT DOCUMENTS

| | | |
|---|---|---|
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Frasner . |
| 4,532,626 | 7/1985 | Flores et al. . |
| 4,644,532 | 2/1987 | George et al. . |
| 4,646,287 | 2/1987 | Larson et al. . |
| 4,665,518 * | 5/1987 | Champlin et al. .................... 370/458 |
| 4,677,423 | 6/1987 | Benvenuto et al. . |
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckber, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasiraj et al. . |
| 4,965,772 | 10/1990 | Daniel et al. . |
| 4,970,678 | 11/1990 | Sladowski et al. . |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,051,987 * | 9/1991 | Conlon ................................ 370/400 |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Berstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleisher et al. . |
| 5,268,592 | 12/1993 | Bellamy et al. . |
| 5,268,900 | 12/1993 | Hluchj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyke et al. . |
| 5,291,482 | 3/1994 | McHarg et al. . |
| 5,305,311 | 4/1994 | Lyles . |
| 5,307,343 | 4/1994 | Bostica et al. . |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,405 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,434,863 | 7/1995 | Onishi et al. . |
| 5,442,451 | 8/1995 | Hamid . |
| 5,442,630 | 8/1995 | Gagliardi et al. . |
| 5,473,599 * | 12/1995 | Li et al. ............................. 370/402 |
| 5,473,607 | 12/1995 | Hausman et al. . |
| 5,477,541 | 12/1995 | White et al. . |
| 5,485,455 | 1/1996 | Dobbins et al. . |
| 5,490,140 | 2/1996 | Abensour et al. . |
| 5,491,687 | 2/1996 | Christensen et al. . |
| 5,491,804 | 2/1996 | Heath et al. . |
| 5,497,368 | 3/1996 | Reijnierse et al. . |
| 5,504,747 | 4/1996 | Sweazey . |
| 5,509,006 | 4/1996 | Wilford et al. . |
| 5,517,494 | 5/1996 | Green . |
| 5,517,620 | 5/1996 | Hasimoto et al. . |
| 5,519,704 | 5/1996 | Farinacci et al. . |
| 5,526,489 | 6/1996 | Nilakanatan et al. . |
| 5,530,963 | 6/1996 | Moore et al. . |
| 5,535,195 | 7/1996 | Lee . |
| 5,539,734 | 7/1996 | Burwell et al. . |
| 5,546,379 | 8/1996 | Thaweethai et al. . |
| 5,555,244 | 9/1996 | Gupta . |
| 5,561,669 | 10/1996 | Lenney et al. . |
| 5,583,862 | 12/1996 | Callon . |

| | | |
|---|---|---|
| 5,592,470 | 1/1997 | Rudrapatna et al. . |
| 5,598,581 | 1/1997 | Daines et al. . |
| 5,600,798 | 2/1997 | Cherukuri et al. . |
| 5,604,868 | 2/1997 | Komine et al. . |
| 5,608,726 | 3/1997 | Virgile . |
| 5,617,417 | 4/1997 | Sathe et al. . |
| 5,617,421 | 4/1997 | Chin et al. . |
| 5,631,908 | 5/1997 | Saxe . |
| 5,632,021 | 5/1997 | Jennings et al. . |
| 5,634,010 | 5/1997 | Ciscon et al. . |
| 5,644,713 | 7/1997 | Makishima . |
| 5,644,718 | 7/1997 | Belove et al. . |
| 5,666,353 | 9/1997 | Klausmeier et al. . |
| 5,673,265 | 9/1997 | Gupta et al. . |
| 5,678,006 | 10/1997 | Valizadeh et al. . |
| 5,680,116 | 10/1997 | Hashimoto et al. . |
| 5,687,324 | 11/1997 | Green et al. . |
| 5,689,640 * | 11/1997 | Okanoue ............................... 709/221 |
| 5,724,351 | 3/1998 | Chao et al. . |
| 5,754,547 | 5/1998 | Nakazawa . |
| 5,835,710 | 11/1998 | Nagami et al. . |
| 5,854,903 | 12/1998 | Morrison et al. . |
| 5,898,686 | 4/1999 | Virgile . |
| 6,097,718 | 8/2000 | Bion . |

OTHER PUBLICATIONS

Perkins, D., "Requirements for an Internet Standard Point-to–Point Protocol", Network Working Group, RFC 1547, Dec. 1993, pp. 1–19.

Simpson, W., "The Point–to–Point Protocol (PPP)", Network Working Group, RFC 1548, Dec. 1993, pp. 1–53.

Tusuchiya, P.F., "A Search Algorithm for Table Entries with NonContinguous Wildcarding", Abstract, Bellcore.

Chowdhury, et al., "Alternative Banddwidth Allocation Algorithms for Packet Video in ATM Networks", 1992, IEEE Inforcom 92, pp. 1061–1068.

Zhang, et al., "Rate–Controlled Static Priority Queueing", 1993, IEEE, pp. 227–236.

Doeringer, et al., "Routing on Longest–Matching Prefixes", IEEE ACM Transactions on Networking, Feb. 1, 1996, vol. 4, No. 1, pp. 86–97.

IBM, "Method and Apparatus for the Statistical Multiplexing of Voice, Data, and Image Signals", Nov. 1992, IBM Technical Data Bullentin n6 11–92, pp.409–411.

Esaki, et al., "Datagram Delivery in an ATM–Internet," IEICE Transactions on Communications vol. E77–B, No. 3, (1994) Mar., Tokyo, Japan.

* cited by examiner

SNAPSHOT ROUTING

CROSS-REFERENCE TO RELATED APPLICATIONS

This application claims priority of Provisional Application Ser. No. 60/001,869, having the same title, filed Aug. 3, 1995 in the name of the same inventor, Express Mail No. EM302067365US, D'Alessandro+Ritchie Docket No. CIS-006, hereby incorporated by reference as if fully set forth herein.

The subject application also is a continuation of copending U.S. patent application Ser. No. 08/582,075, filed Jan. 2, 1996, having the same title, now U.S. Pat. No. 6,097,718. The entirety of said U.S. Pat. No. 6,097,718 is hereby incorporated by reference.

BACKGROUND OF THE INVENTION

1. Field of the Invention

This invention relates to maintaining and updating routing information in a packet switching network.

2. Description of Related Art

In routing messages in a computer network or in a network of networks (an "internetwork"), protocols for routing message packets generally provide two types of routes to a destination—static routes and dynamic routes. Static routes are reselected and configured before routing in a set of routing tables; typically this is performed manually. Dynamic routes are configured dynamically in response to routing information from other nodes; these routes require periodic updates (i.e., refreshes) of connectivity information, typically involving route refresh, adjacent node refresh, or other means.

One problem which has arisen in the art is that of intermittent connections—connections which are not continuously active, and for which lack of connectivity information refresh does not necessarily indicate that the connection has failed. For example, one type of intermittent connection is a dial-up link, such as used for dial-on-demand routing. For these communication links, it is generally undesirable and sometimes impossible to have routing and connectivity updates transmitted continuously. For example, in dial-on-demand routing, it is not generally possible to communicate routing and connectivity updates when the dial-up link is inactive.

One known method of treating dial-on-demand routing has been to statically configure the remote router with routing information indicating which devices can be located through a particular port (often a serial dial-up link) on the remote router. When a packet arrives at the remote router destined for one or more such devices, then the dial-up link is activated. Because the dial-up link can access a large number of devices at a large number of sites, large static tables are required, static tables must be updated either manually or through periodic downloading of information in response to manual requests. Such manual management of these static tables is a significant task.

Known routing protocols (such as distance vector algorithms or link state algorithms) utilize dynamic routing updates and therefore cannot generally accommodate intermittent connections. These protocols "age" routing or connectivity information—if a device advertising the route is not heard from for a preselected time interval, existing routing protocols presume that the routes through the device are no longer available using that device, and the routing tables are updated accordingly.

Accordingly, it would be advantageous to provide a method and system in which routes including intermittent connections enjoyed the btgt aspects of both dynamic routes and static routes. Ideally, such routes and connectivity information could be dynamically updated using known protocol techniques for dynamic routes, but would not age during times when routing or connectivity information was not available for those connections.

SUMMARY OF THE INVENTION

The invention provides a method and system for maintaining and updating routing and connectivity information in a packet switching network for a set of quasidynamic routes, in which intermittent routing and connectivity updates are permitted, so that routes and connectivity information are no longer "always static" or "always dynamic", but may change over time between static and dynamic, and are treated accordingly. The change can be in response to input from an external source, or, more generally, from an event noticed ty the routing protocol. The invention is particularly applicable to dial-on-demand serial communication links, but is also useful in any situation where it is desired to reduce the overhead from routing and connectivity updates over a communication link, or where transmission over a communication link is not reliable.

In a preferred embodiment, a protocol manager for a dynamic routing protocol is modified to determine, for each route, (1) whether to send updated routing information for that route (at the time it would otherwise send an update for a particular route), and (2) whether to age that route in its routing tables (at the time it would otherwise age that route). The modified protocol manager thus prevents automatic aging of routes, while avoiding the use of manually configured static routing tables. Routing information is thus learned automatically and dynamically at appropriate time, and refreshed periodically so that it eventually reflects actual changes to the network topology.

In a preferred embodiment, the invention is implemented on a router in two component parts: a snapshot engine and a modified routing protocol engine. For two connected routers, the snapshot engine comprises a client for one and a server for the other. The routing protocol engine does not need to know by what criteria the snapshot engine decides the answers to the two questions indicated above; it only needs to be able to get the answers from the snapshot engine. In alternative embodiments, the protocol engine may be modified to incorporate this intelligence and answer these questions itself.

In a preferred embodiment, the client snapshot engine determines a set of "vactive periods" and a set of "quiet periods" for receiving routing updates from the server. During the active period, the communication link is activated, routing and connectivity information is exchanged between the server and client, routing tables are updated at the server and client, and routing information can age at a "normal" rate at the server and client. In this manner, the routing information is automatically periodically refreshed through inherent operation of the protocol, and without packet overhead. During quiet periods, routing information is maintained statically at the server and client without aging, and treated as valid until the next active period for that communication link.

In a preferred embodiment, the client snapshot engine enters active periods at predetermined time intervals, during which it sends updated routing information to the server, and the server responds by sending updated routing information to the client. The server knows the length of the active period. No clock synchronization is necessary. Aging of a route at the client is driven by the reception of packets at the client from the router that originally provided that route to the client. Aging is event-driven. The aging of a route N from router R is triggered only by receipt of new information after a quiet period from router R.

DESCRIPTION OF THE PREFERRED EMBODIMENTS

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

Client/Server Model for Updated Connectivity Information

Figure 1:
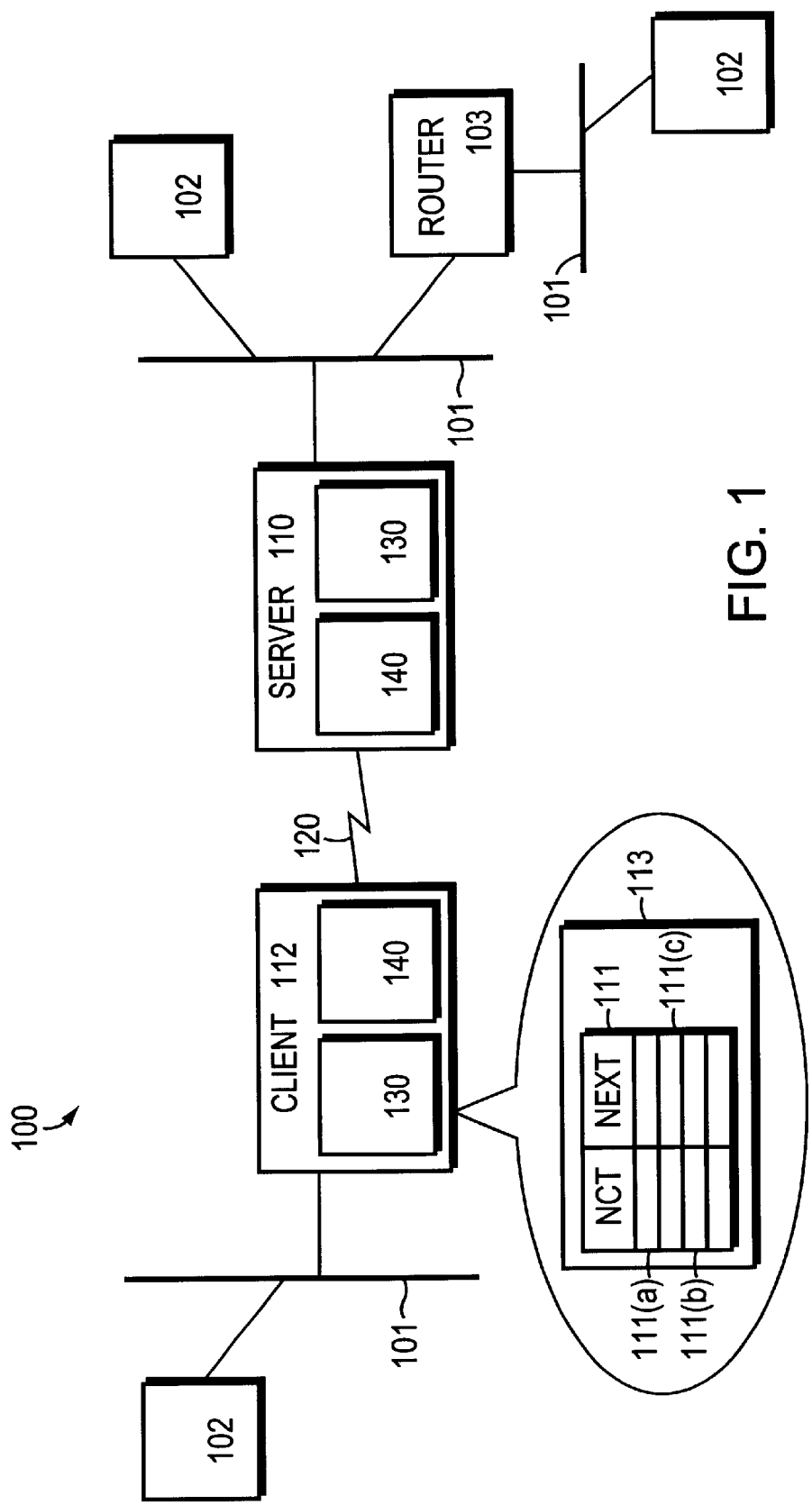
FIG. 1 shows a block diagram of a communication link in a system including an internetwork.

FIG. 1 shows a block diagram of a communication link in a system including an internetwork.

A network of networks (an "internetwork") 100 comprises a set of networks 101 each having one or more devices 102 coupled thereto. Between two networks 101 are coupled one or more routers 103, for communicating messages between those two networks 101.

A first device 102 coupled to a first network 101 comprises an information server 110, and provides connectivity information about the internetwork. This connectivity information comprises a set of routes 111, each comprising an ordered pair having a value for a network 101 and a value for a next-hop device 102. Each ordered pair thus informs a router 103 to which local device 102 (i.e., which device 102 on a network 101 to which the router 103 is directly connected) to send a messages, to cause that message to arrive at a remote device 102 on the specified network 101.

A second device 102 coupled to a second network 101 comprises a client 112 for the connectivity information, which it obtains from the server 110. The client 112 records the connectivity information in a connectivity table 113.

The connectivity table 113 includes a set of static routes 111(a), which are preselected and entered into the connectivity table 113 at a time before the client 112 attempts to route any messages. For example, static routes 111(a) may be entered into the connectivity table 113 when the client 112 is powered on or when it is restarted.

The connectivity table 113 also includes a set of dynamic routes 111(b), which are learned from servers 110 such as neighbor routers 103 and updated in the connectivity table 113 periodically, in response to updated connectivity information.

Typically, a routing protocol employed by one or more routers 103 includes a technique for updating the dynamic routes 111(b) in the connectivity table 113, in response to updated connectivity information. For example, in a "distance vector" protocol, the dynamic routes 111(b) are advertised by a neighbor router 103 (or other server 110) with every update, and the client 112 updates the connectivity table 113 accordingly. The dynamic routes 111(a) associated with each next-hop device 102 are "aged" to indicate how long it has been since a message from that next-hop device 102. The present invention is preferably implemented in conjunction with a distance vector protocol, but it is equally applicable to a link state protocol or another protocol, and the embodiments disclosed herein would also work with such protocols.

The connectivity table 113 also includes a set of quasi-dynamic routes 111(c). As used herein, quasidynamic routes are routes which are not "always static" or "always dynamic", but may change over time between static and dynamic, and are treated accordingly, preferably in response to events noted by the routing protocol.

Quasidynamic routes are like dynamic routes 111(b), but sending updates and aging routes 111 for quasidynamic routes is subject to a snapshot engine 130. The snapshot engine 130 determines for each quasidynamic route 111(c), in response to requests from a protocol engine 140 for the client 112, whether to age that route 111 in the connectivity table 113, and in response to requests prom a protocol engine 140 for the server 110, whether to send periodic or updated connectivity information for that route 111.

For a quasidynamic route 111(c), the client 112 and the server 110 are coupled by a communication link 120. In a preferred embodiment, the communication link 120 comprises a telephone connection coupled using a telephone network when the client 112 dials the server 110, such as a "dial-on-demand" connection. However, in alternative embodiments, the communication link 120 could comprise a wide variety of other types of connection, including an intermittent connection, a mobile connection, or a low bandwidth connection (or a connection whose bandwidth is variable). In general, the communication link 120 may comprise any type of connection in which it is undesirable to frequently transmit connectivity information.

In a preferred embodiment, the client 112 may use the communication link 120 to couple to more than one server 110. For example, if the communication link 120 is a telephone connection, the client 112 may use the telephone connection to couple to a first server 110 in a first location, followed by a second server 110 in a second location, and so on. Similarly, more than one client 112 may use the communication link 120 to couple to a single server 110. For example, if the communication link 120 is a telephone connection, a first client 112 in a first location may use the telephone connection to couple to the server 110, after which a second client 112 in a second location may use the telephone connection to couple to the server 110, and so on.

In alternative embodiments, the client 112 may be coupled to the server 110 by a primary communication link 120 which is maintained substantially constantly, and by a secondary communication link 120 which is used to couple the client 112 and the server 110 as a backup for the primary communication link 120. In such alternative embodiments, the client 112 maintains a primary set of dynamic routes 111(b) in the connectivity table 113 which relate to the primary communication link 120, and a secondary set of dynamic routes 111(b) in the connectivity table 113 which relate to the secondary communication link 120. The secondary set of dynamic routes 111(b) are used when and if the primary communication link 120 is lost. In some alternative embodiments, the client 112 may maintain the secondary set of dynamic routes 111 in a separate connectivity table 113(b)

or in backup storage for inclusion in the connectivity table 113 when and if the primary communication link 120 is lost.

When the client 112 is coupled to the server 110 using the communication link 120, the snapshot engine 130 permits the connectivity table 113 to be updated in response to updated connectivity information, by the protocol engine 140 according to the routing protocol and at the regular intervals dictated by that routing protocol.

However, when the client 112 is not coupled to the server 110 using the communication link 120 the snapshot engine 130 freezes those routes 111 in the connectivity table 113. The routes are thus held unchanged in the connectivity table 113 for much longer times, and only updated at intervals selected by the snapshot engine 130. The selected intervals may be responsive to selected events, such as telephone busy signals. In a preferred embodiment, the selected intervals are typically much longer than the regular intervals dictated by the routing protocol, but they are in fact selected to account for changes in the real world status communication link 120, such as losing a telephone connection.

Operation of Snapshot Engine and Protocol Engine

Figure 2:
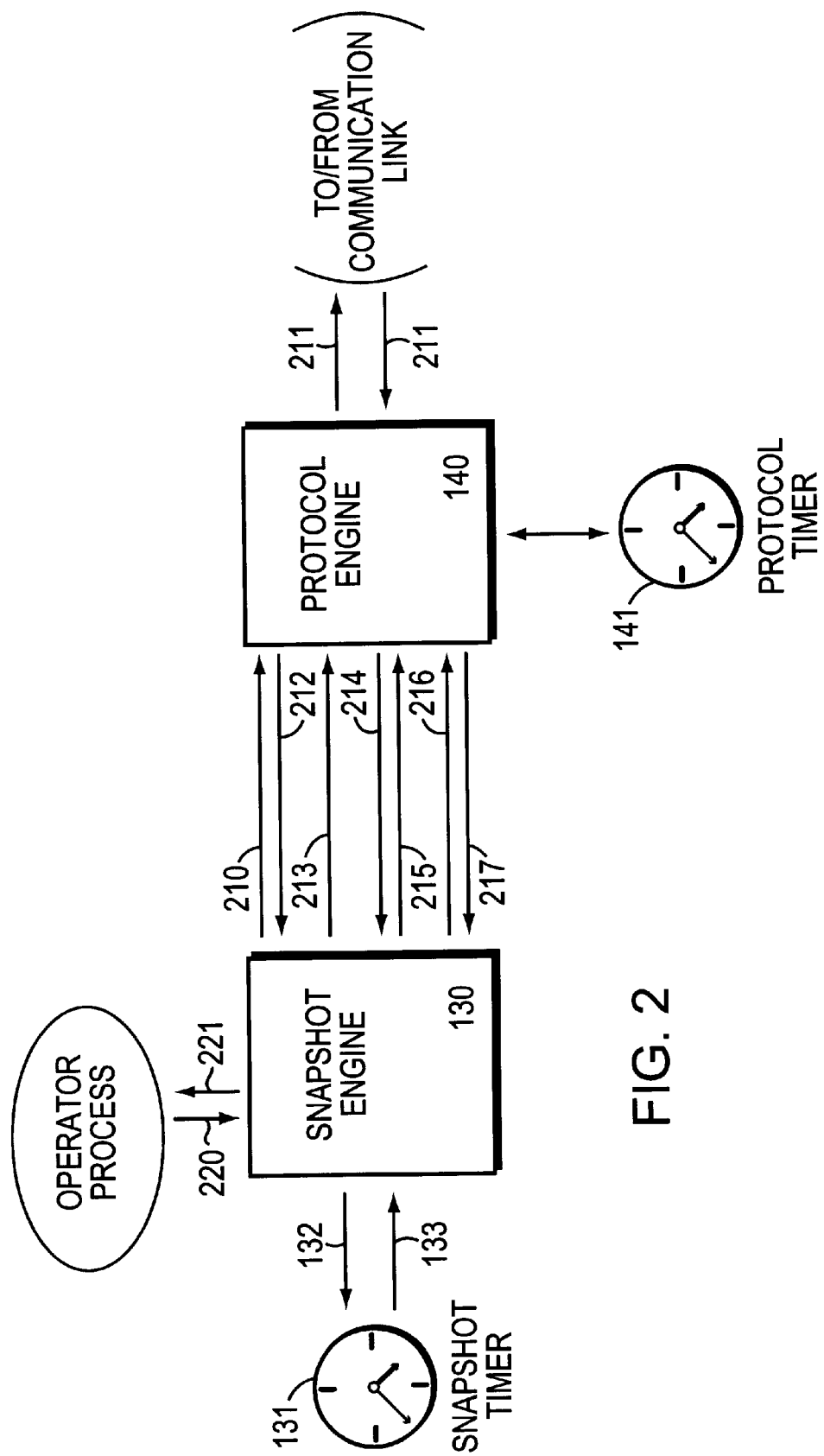
FIG. 2 shows a block diagram of a system having a protocol manager and a snapshot engine.

FIG. 2 shows a block diagram of a system having a snapshot engine and a protocol engine.

In a preferred embodiment, the snapshot engine 130 comprises a software element operating on a processor at the client 112 (or at the server 110) and in conjunction with operating system software on that processor. Similarly, a protocol engine 140 also comprises a software element operating on a processor at the client 112 (or at the server 110) and in conjunction with operating system software on that processor. The snapshot engine 130 operates in conjunction with a timer 131 set by a timer-set message 132 and responding with a timer-hit message 133, while the protocol engine 140 operates in conjunction with a timer 141. Preferably, the snapshot engine 130 also operates in conjunction with an operator process 200, which is itself responsive to commands from an operator.

The protocol engine 140 implements the network routing protocol, which preferably comprises one or more of the protocols shown in table 2-1. Other protocols may also be accommodated.

TABLE 2-1

| Message Packets | Routing Protocol |
| --- | --- |
| AppleTalk | RTMP |
| IP | RIP, IGRP, OSPF, or ISIS |
| IPX | RIP, SAP, or NSCP |
| VINES | RTP or SRTP |

The operation of the snapshot engine 130, both at the client 112 and at the server 110, requires no additional packets to be transmitted or received on the communication link 120. Thus, the operation of the snapshot engine 130 is fully compatible with session layer protocols, such as IPX-WAN.

The snapshot engine 130 determines a set of "active periods" for receiving updated connectivity information regarding routes 111 using the communication link 120 during which quasidynamic routes 111(c) therein are aged according to the protocol technique as if they were dynamic routes 111(b), and a set of "quiet periods" during which quasidynamic routes 111(c) are held constant as if they were static routes 111(a).

In a preferred embodiment, active periods occur at preselected times, depending on the nature of the communication link 120. For example, if the communication link 120 is a dial-on-demand telephone connection, one active period might occur every 4 hours, every 12 hours, or every 24 hours, or some other preselected periodic time, depending on a settable parameter. Active periods last at least a preselected time period which exceeds three times a route update time for the protocol, so that updated connectivity information can reasonably be expected to be received at least once during each active period. For example, an active period may last for at least 3 minutes, for 10 minutes, or for some other preselected time period, depending on a second settable parameter. The duration of an active period may also be extended by events. For example, where the communication link 120 is a dial-on-demand telephone connection, the active period may be extended if the telephone connection fails to be established (causing a retry) or is unexpectedly terminated (also causing a retry).

In alternative embodiments, other and further active time triggers may be used. Such other and further active time triggers may include the reinitialization or restart of either protocol engine 140, or operator process 200 making an explicit request to start the active time.

In a preferred embodiment, when the snapshot engine 130 is first invoked for the communication link 120, it starts by placing all routes 111 using the communication link 120 into the active period. Preferably, this initial active period lasts a preselected time period, long enough that it is expected that routes 111 using the communication link 120 are learned and that connectivity information therefore are recorded in the connectivity table 113.

The snapshot engine 130 triggers the protocol engine 140 by transmitting a send-update message 210. In response to the send-update message 210, the protocol engine 140 causes the server 110 to start sending the appropriate protocol packet 211 to the client 112.

The snapshot engine 130 at the client 112 transmits the send-update message 210 at the beginning of each active period, thus in response to a timer-hit message 133 indicating that an active period should begin. The snapshot engine 130 at the server 110 does not transmit the send-update message 210.

Protocol packets 211 arrive at the protocol engine 140 for either the client 112 or the server 110 comprising updated connectivity information, (These protocol packets 211 arrive at the protocol engine 140 for the server 110 when the snapshot engine 130 for the client 112 has transmitted a send-update message 210, however, this operation is symmetrical for the client 112 and the server 110.) In response to these packets 211, the protocol engine 140 transmits a received-update message 212 to the snapshot engine 130. The received-update message 212 comprises a timestamp for the time when the packet 211 comprising updated connectivity information was received.

In response to the received-update message 212, the snapshot engine 130 transmits a start-aging message 213 to the protocol engine 140, comprising a timestamp for the time from when the protocol engine 140 should start aging routes 111. The protocol engine 140 examines each route 111 in the connectivity table 113 to determine if that route 111 is static, dynamic, or quasidynamic. Quasidynamic routes 111(c) are controlled by the snapshot engine 130. Thus, receipt of packets 211 comprising updated connectivity information causes the server 110 to also enter the active period for quasidynamic routes 111(c) using the communication link 120.

For each quasidynamic route 111(c) which the protocol engine 140 has determined, according to the unmodified protocol technique, that the route 111 should be aged, the protocol engine 140 transmits a want-to-age message 214 to the snapshot engine 130. In response to the want-to-age message 214, the snapshot engine 130 transmits an OK-to-age message 215 having a "yes" or a "no" answer. During the route's active periods, the answer will be "yes", while during the route's quiet periods, the answer will be "no". The protocol engine 140 receives the OK-to-age message 215 and either ages the route 111 or does not, accordingly. Thus, quasidynamic routes 111(c) are aged during active periods and remain static (not aged) during quiet periods.

According to the protocol, the protocol engine 140 at the server 110 will at some time desire to send a protocol packet 211 having updated connectivity information to the client 112. (These times include when the server 110 receives updated connectivity information from the client 112.) Before doing so, for each quasidynamic route 111(c), the protocol engine 140 transmits a want-to-send message 216 to the snapshot engine 130. In response to the want-to-send message 216, the snapshot engine 130 transmits an OK-to-update message 217 having a "yes" or "no" answer. During the route's active periods, the answer will be "yes", while during the route's quiet periods, the answer will be "no". The protocol engine 140 receives the QK-to-update message 217 and either sends the protocol packet 211 or does not, accordingly. Thus, quasidynamic routes 111 are updated during active periods and remain static (not updated) during quiet periods.

In response to a request by an operator, the operator process 200 transmits a operator-command message 220 to the snap-shot engine 130. In response to the operator-command message 220, the snapshot engine 130 transmits a command-response message 221 to the operator process 200. The command-response message 221 comprises information about the snapshot process 130 or about quasidynamic routes 111 in the connectivity table 113, if requested by the operator-command message 220, and confirmation of an activity taken for the snapshot process 130 or for quasidynamic routes 111(c) in the connectivity table 113, if requested by the operator-command message 220.

The operator-command message 220 may comprise a request for the status of the snapshot process 130 and about quasidynamic routes 111(c) in the connectivity table 113. In this event, the command-response message 221 comprises information about the snapshot process 130 or about quasidynamic routes 111(c) in the connectivity table 113.

The operator-command message 220 may comprise a command to set the time period for active periods and for quiet periods, to configure the snapshot engine 130 as a client 112, to set options for the snapshot engine 130, and to cause the snapshot engine 130 to enter the active time for one or more servers. In this event, the command-response message 221 comprises an acknowledgment that the command has been performed. In a preferred embodiment, options for the snapshot engine 130 comprise those shown in table 2-2.

TABLE 2-2

| Option | Meaning |
| --- | --- |
| suppress-statechange-updates OFF | each time the communication link is activated, start an active period |
| suppress-statechange-updates ON | not "suppress-statechange-updates OFF" |
| dialer OFF | not "dialer ON" |

TABLE 2-2-continued

| Option | Meaning |
| --- | --- |
| dialer ON | enable support of dial-on-demand telephone connections |

Support for dial-on-demand telephone connections comprises associating the communication link 120 with a set of remote telephone numbers to call to establish telephone connections. Dialer rotary groups are preferred because they will not go down when the dialer drops. PPP and CHAP authentication are preferred for dial-on-demand telephone connections.

Additional operator-command messages 220 are shown in table 2-3.

TABLE 2-3

| Command Message | Meaning or Effect |
| --- | --- |
| debug snapshot | enables debugging for the snapshot engine (will show snapshot engine state transitions, configuration changes, and when the protocol engine starts to age routes |
| clear snapshot quiet-time <interface> | re-enter active period for <interface> |
| show snapshot <interface> | show snapshot engine parameters (for all interfaces if no individual interface is specified), including options, active period length, quiet period length, and retry period length |

Those skilled in the art will recognize, after perusal of this application, that other and further messages from the operator process 200, and responses thereto, are within the scope and spirit of the invention. Such other and further messages would be clear after perusal of this application, and would not require invention or undue experimentation.

The snapshot engine 130 maintains a data structure, called a "snapshot activity block". For clients 112, there is one snapshot activity block per server 110 to be coupled to the communication link 120. For servers 110, there is one snapshot activity block per router 103 supplying connectivity information, per protocol used at that router 103.

Each snapshot activity block is assigned to one of the states shown in table 2-4.

TABLE 2-4

| State | Meaning |
| --- | --- |
| active | active period; updates being sent out |
| client_quiet | waiting for next active period; updates not being sent out |
| server_post_active | updates not being sent out; if update packet received from client, it is processed but does not trigger entry to active state |
| client_post_active_next_quiet | updates not being sent out; if any external event would trigger entry to active state, must wait for "must remain quiet period" (2 minutes); if no such trigger, transition to client_quiet state |

TABLE 2-4-continued

| State | Meaning |
| --- | --- |
| client_post_active_next_active | updates not being sent out; any external event has triggered entry to active state after "must remain quiet period" |
| no_queue | snapshot activity block is newly created or deleted and not assigned to any particular state |

The "client_post_active_next_quiet" and "client_post_active_next_active" states are intended as short transition states between the "active" state and the "client_quiet" state.

A timer for the time to remain in the indicated state is periodically decremented, after which the state is changed as shown in table 2-5.

TABLE 2-5

| State | Transition |
| --- | --- |
| active | change state to "client_post_active_next_quiet" (for client) or "server_post_active" (for server) |
| client_quiet | change state to "active"; change timer to active period length |
| server_post_active | delete snapshot activity block |
| client_post_active_next_quiet | change state to "client_quiet"; change timer to quiet period length if update packets have been received, to retry period length if not or if update packets were received for less than 3 full minutes |
| client_post_active_next_active | change state to "active"; change timer to active period length |

At the client 112, when a snapshot activity block is in the "active" state, once per minute the snapshot engine 130 requests that the communication link 120 be made active. For a dial-on-demand connection, if the telephone connection is already active, this merely resets the appropriate timers; if the telephone connection is not active, this causes a telephone dialer to attempt to make the connections. Once per second the snapshot engine 130 requests the telephone dialer to reset its dialer interface idle timers, to ensure the telephone connection remains coupled for the entire active period.

At the server 110, the snapshot engine 130 does not attempt to maintain the communication link 120 connected, but allows the client 112 to decide. When any telephone connection becomes connected, the server 110 maintains that telephone connection in the active state for the entire active period, plus an extra 2 minutes, so that any client 112 attempting to connect to the server 110 using that communication link 120 may maintain the telephone connection for a full active period.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A method for routing messages in a network, comprising:

following a routing protocol, said routing protocol transmitting updated connectivity information between routers and aging a route in a routing table;

making a determination whether to transmit said updated connectivity information between routers;

dynamically updating, during an active period of said route and in response to said determination, an entry in a memory in response to reception of updated connectivity information, said entry corresponding to a quasidynamic route; and statically holding said entry constant during a non-active period for said quasidynamic route.

2. A method as in claim 1, wherein said active period is a preselected duration.

3. A method as in claim 1, wherein said non-active period is at least a preselected minimum duration.

4. A network device comprising:

a protocol engine receiving updated connectivity information from another network device;

a memory containing information that is subject to update, responsive to reception of said updated connectivity information, said update occurring during an active period of a communication link, and said update not occurring during a non-active period of the link.

5. A network device as in claim 4, wherein said active period is of a preselected duration.

6. A network device as in claim 4, wherein said non-active period is a preselected minimum duration.

7. A system comprising:

a routing table comprising at least one entry comprising quasidynamic route information, said quasidynamic route information regarding at least one destination reachable from a device;

wherein said information is subject to update during a first state in response response to reception of updated connectivity information, said state occuring during an active period of a communication link; and also wherein;

said information is not subject to update during a second state, said second state occuring during a non-active period of said communication link.

8. A system as in claim 7, wherein said active period is of a preselected duration.

9. A system as in claim 7, wherein said active period is at least of a preselected minimun duration.

10. A system a in claim 7, wherein said communication link is a telephone connection.

11. A system as in claim 7, wherein said communication link is a dial-on-demand telephone connection.

12. A network device comprising:

a snapshot timer to determine whether a communication link should transition to an active state;

a protocol engine, responsive to said snapshot timer, transmitting updated connectivity information to another network device over said communication link, said update occurring during an active period of said communication link, and said update not occurring during a non-active period of said link.

* * * * *